US009124602B2

(12) United States Patent
Kuehr-McLaren et al.

(10) Patent No.: US 9,124,602 B2
(45) Date of Patent: Sep. 1, 2015

(54) METHOD AND APPARATUS FOR CREATING CUSTOM ACCESS CONTROL HIERARCHIES

(75) Inventors: David G. Kuehr-McLaren, Apex, NC (US); Kwabena Mireku, Durham, NC (US); Govindaraj Sampathkumar, Cary, NC (US); Janette S. Wong, North York (CA)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 11/620,219

(22) Filed: Jan. 5, 2007

(65) Prior Publication Data

US 2008/0168530 A1 Jul. 10, 2008

(51) Int. Cl.
*G06F 7/04* (2006.01)
*H04L 29/06* (2006.01)
*G06F 21/62* (2013.01)

(52) U.S. Cl.
CPC .......... *H04L 63/105* (2013.01); *G06F 21/6218* (2013.01); *G06F 21/6236* (2013.01)

(58) Field of Classification Search
USPC .............................................. 726/1, 4; 707/9
See application file for complete search history.

(56) References Cited

U.S. PATENT DOCUMENTS

| 6,505,244 | B1 | 1/2003 | Natarajan et al. ............. 709/223 |
| 6,718,380 | B1 | 4/2004 | Mohaban et al. ............. 709/223 |
| 6,751,662 | B1 | 6/2004 | Natarajan et al. ............. 709/223 |
| 6,765,864 | B1 | 7/2004 | Natarajan et al. ............. 370/224 |
| 6,769,024 | B1 | 7/2004 | Natarajan et al. ............. 709/224 |
| 7,019,740 | B2 * | 3/2006 | Georgalas ...................... 345/418 |
| 2003/0018760 | A1 | 1/2003 | Putzolu et al. ................ 709/223 |
| 2003/0088614 | A1 | 5/2003 | Bellaton et al. ............... 709/203 |
| 2003/0097575 | A1 | 5/2003 | Owada et al. ................. 713/189 |
| 2004/0148517 | A1 * | 7/2004 | Banks-Binici et al. ........ 713/201 |
| 2004/0254884 | A1 * | 12/2004 | Haber et al. .................... 705/51 |
| 2005/0050073 | A1 * | 3/2005 | Demiroski et al. ........... 707/100 |
| 2005/0071449 | A1 | 3/2005 | Alex et al. ..................... 709/223 |
| 2006/0028252 | A1 * | 2/2006 | McCauley et al. ............ 327/120 |
| 2007/0185916 | A1 * | 8/2007 | Prahlad et al. ................ 707/200 |
| 2008/0021921 | A1 * | 1/2008 | Horn ............................. 707/102 |

FOREIGN PATENT DOCUMENTS

EP 1653710 5/2006 ............. H04L 29/12

* cited by examiner

*Primary Examiner* — Brandon Hoffman
(74) *Attorney, Agent, or Firm* — Jordan IP Law, LLC

(57) ABSTRACT

The Custom Access Controller adds a custom security hierarchy to the organizational data in the View Processor of WEBSPHERE Virtual Member Manager. Whenever an entity or application attempts to access a resources the access control engine starts the View Processor to identify the organizational data and assigned security policy for the resource. The assigned security policy is applied to a delegated administration path which is part of the delegated administration hierarchy but includes the appropriate path and security policy for the resource. The delegated administration path is sent to an access control engine that grants or denies access to the resource. A View Processor Interface allows network administrators to create and modify custom security hierarchies.

18 Claims, 4 Drawing Sheets

METHOD AND APPARATUS FOR CREATING CUSTOM ACCESS CONTROL HIERARCHIES

FIELD OF THE INVENTION

The invention relates to the security of files, objects or other resources on a network and how access to the resources is granted.

BACKGROUND OF THE INVENTION

Security levels are used to limit access to resources, such as applications, objects, and files, on a computer. The security levels for resources are assigned as a function of a computer's file system. Each resources requires a certain security level to be accessed, viewed or updated. Examples of the security levels, ordered from highest to lowest, are root/admin, super user, user, and guest. Thus, a database table may require "user" level access to read the contents, "super user" to change a table entry, and "admin" to delete the table. A user with a "guest" access level would not be able to even read the table. Assignment of security levels to resources and limiting user access to restricted resources is well known in the art.

Each server, computer, or logical partition on a network has its own file system. Because resources are distributed across different file systems, a "resource manager" is used to create a hierarchy categorizing the files, applications and other objects on the network. An "authorization engine" is part of the resource manager that controls access to each resource. The authorization engine uses the file system security levels for each component of the network. Because of the differences in security protocols between file systems, users of a resource on one file system on the network may have difficulty accessing another resource on another file system on the network.

Middleware is software designed to facilitate interoperability between different file systems on a network. IBM's WEBSPHERE Virtual Member Manger is an example of middleware. WEBSPHERE Virtual Member Manger and other middleware products use "access control engines" to overcome problems caused by different security protocols used by different file systems on the same network. An access control engine insulates applications from a resource manager by separating the authorization engine from the rest of the resource manager. The access control engine can, for example, supply a security proxy granting a user or an object access to another resource.

IBM developed a View Processor plug-in to WEBSPHERE Virtual Member Manger for displaying multiple views on the same set of organizational data. The View Processor works with WEBSPHERE Virtual Member Manger components, including the access control engine. The View Processor collects organizational data from repositories on each file system, then displays the organizational data in a uniform manner. The View Processor transforms the organizational data related to resources on a file system into a "delegated administration hierarchy." Each resource on a delegated administration hierarchy can be represented by a delegated administration path, which describes the resource's physical or logical location in the delegated administration hierarchy. The View Processor allows network users or administrators to define custom organizational hierarchies that transcend the physical or logical locations on a file system. Custom organizational hierarchies allow resources to be categorized by how the resources interrelate independently from how or where the resources are stored on the network. Custom organizational hierarchies can organize resources by a business functional role or by a corporate reporting structure. For example, the Human Resources group of a company may need to access payroll data on a first server with a LDAP file system and may need to access time keeping data on a second server with a different file system. A custom Human Resources hierarchy can be set up that shows both the payroll and time keeping resources within the same organizational structure. A second example of a custom organization hierarchy could display a reporting view of an organization where the reporting hierarchy consists of managers and their employees.

Although access control engines overcome some of the limitations caused by native file system security protocols, access control engines are still limited by the defined organizational hierarchies of the underlying file systems. The access control engine must work within these predefined frameworks when assigning security proxies for granting access to resources on different file systems on a network. A need exists for a method to transform pre-defined organizational hierarchies of underlying file systems to a uniform custom organizational hierarchy, and apply the security protocols of the pre-defined underlying organizational hierarchy to the custom organizational hierarchy for use by an access control engine.

SUMMARY OF THE INVENTION

The Custom Access Controller adds a custom security hierarchy to the organizational data in the View Processor of WEBSPHERE Virtual Member Manager. Whenever an entity or application attempts to access a resource, the access control engine starts the View Processor to identify a delegated administration path with the organizational data and assigned security policy for the resource. The assigned security policy identifies the security policy of the entity or application and applies the security policy to the delegated administration path. The delegated administration path and security policies are sent to an access control engine that grants or denies access to the resource. A View Processor Interface allows network administrators to create and modify custom security hierarchies.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Custom Access Controller"

Figure 1:
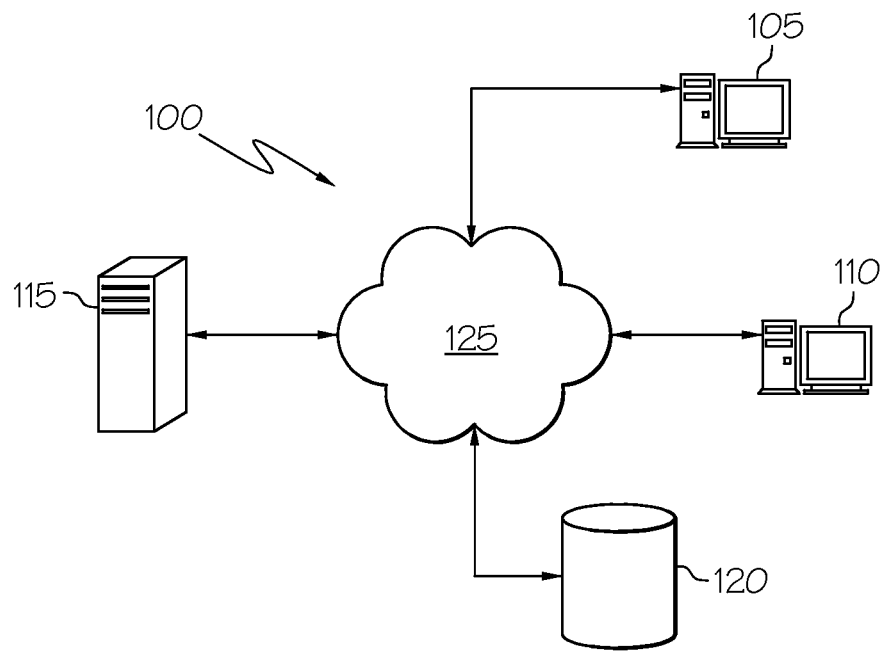
FIG. 1 is an exemplary computer network.

Additionally, the Custom Access Controller is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
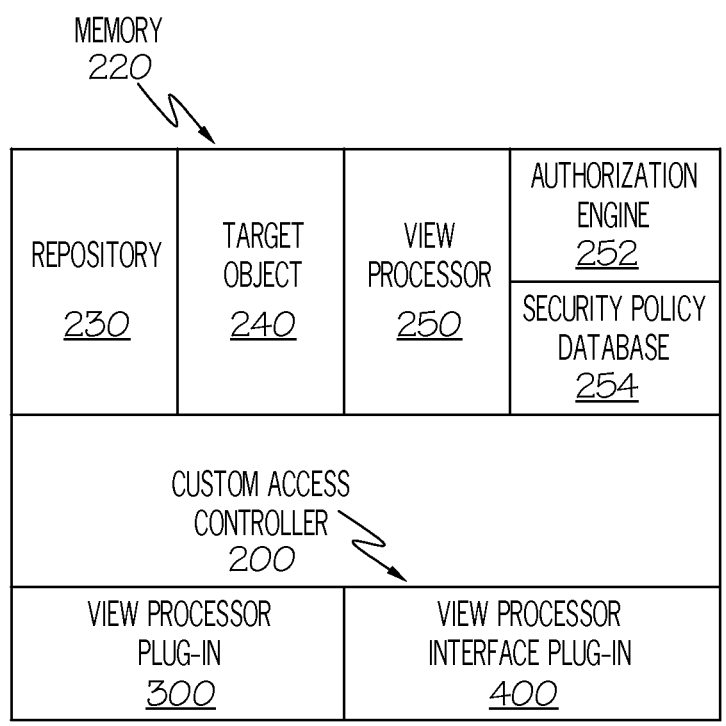
FIG. 2 describes programs and files in a memory on a computer.

Custom Access Controller 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further Custom Access Controller 200 may reside in more than one memory distributed across different computers, servers, logical partitions, or other hardware devices. The elements depicted in memory 220 may be located in or distributed across separate memories in any combination, and Custom Access Controller 200 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import to Custom Access Controller 200, memory 220 may include repository 230, target object 240, and View Processor 250 with which Custom Access Controller 200 interacts. View Processor 250 is an existing middleware identity manager included in IBM's WEBSPHERE Virtual Member Manager having an authorization engine 252 and a hierarchy database 254. Custom Access Controller 200 has View Processor Plug-In 300 and View Processor Interface Plug-In 400.

Figure 3:
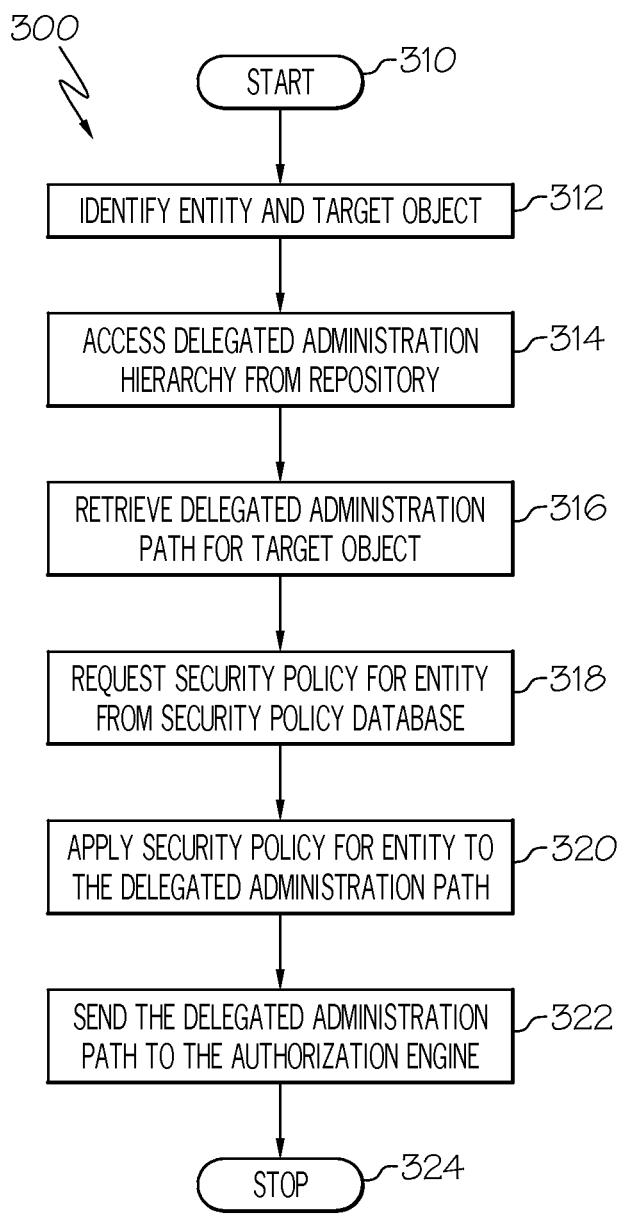
FIG. 3 is a flowchart of a View Processor.

Referring to FIG. 3, View Processor Plug-In 300 starts (310) in response to an entity attempting to access or perform an action on target object 240 on network 100. View Processor Plug-In 300 identifies the entity and target object 240 (312). View Processor Plug-In 300 accesses the Delegated Administration Hierarchy from repository 230 to identify organizational data related to target object 240 (314). View Processor Plug-In 300 retrieves a custom delegated administration path for target object 240 (316). View Processor Plug-In 300 requests a security policy from security policy database 254 (318) and applies the security policy for the entity to the delegated administration path (320). The View Processor Plug-In 300 sends the delegated administration path to Authorization Engine 252 (322) which evaluates the delegated administration path and grants or denies access to the object. After sending the delegated administration path, View Processor Plug-In 300 stops (324).

Figure 4:
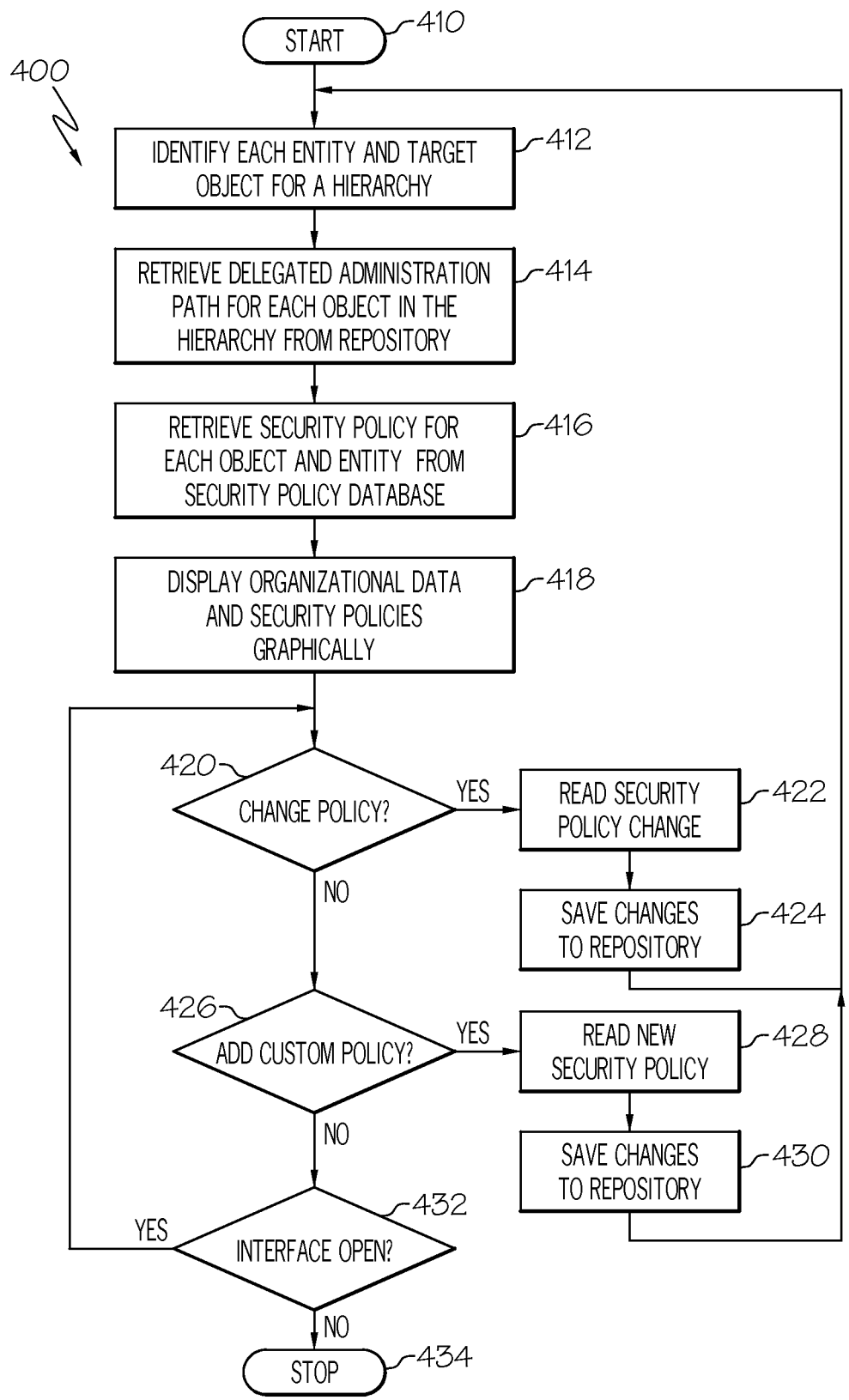
FIG. 4 is a flowchart of a View Processor Interface.

FIG. 4 shows the steps taken when an administrator on network 100 initiates View Processor Interface Plug-In 400 (410). View Processor Interface Plug-In 400 identifies each entity and target object for a hierarchy (412). View Processor Interface Plug-In 400 retrieves the delegated administration path for each identified target object from repository 230 (414). View Processor Interface Plug-In 400 retrieves security policies for each identified entity and target object from security policy database 252 (416). Using the delegated administration path and security policies, View Processor Interface Plug-In 400 displays a graphical representation of the organizational data and security policies (418). The graphical display contains prompts, such as drop down menus or interactive words or images that allow an administrator to make changes to the security policies in an existing data hierarchy or to create a custom policy. If the administrator wants to change an existing security policy (420), View Processor Interface Plug-In 400 reads the security policy change (422) and saves the change to repository 230 (424). If the administrator wants to create a custom security policy (426), View Processor Interface Plug-In 400 reads the new security policy (428) and saves the change to repository 230 (430). After saving changes to a repository, View Processor Interface Plug-In 400 goes back to step 412 to collect and display the new organizational data and security policies. View Processor Interface Plug-In 400 continues to allow the administrator to make changes (steps 420-430) for as long as View Processor Interface Plug-In 400 remains open (432) and when the administrator is finished, View Processor Interface Plug-In 400 stops (434).

Figure 5A:
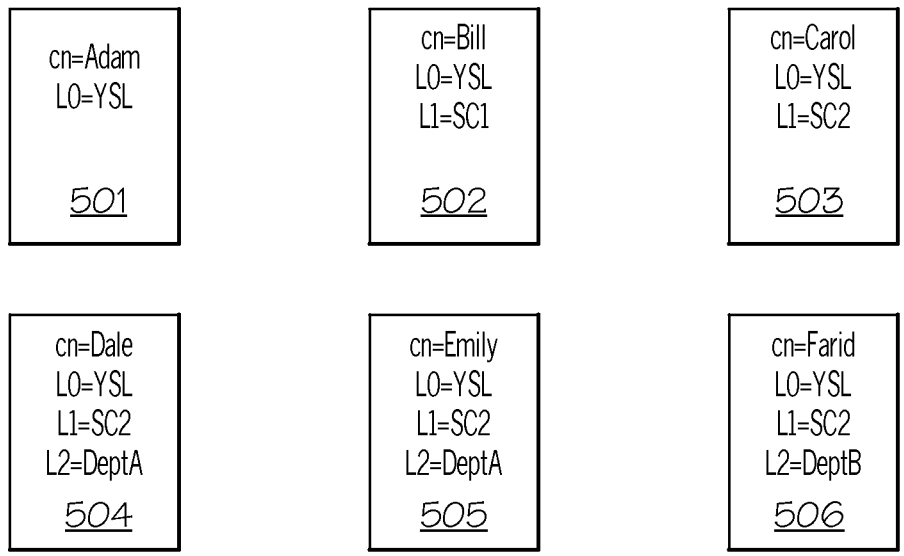
FIG. 5A represents repository entries describing objects on a resource.
Figure 5B:
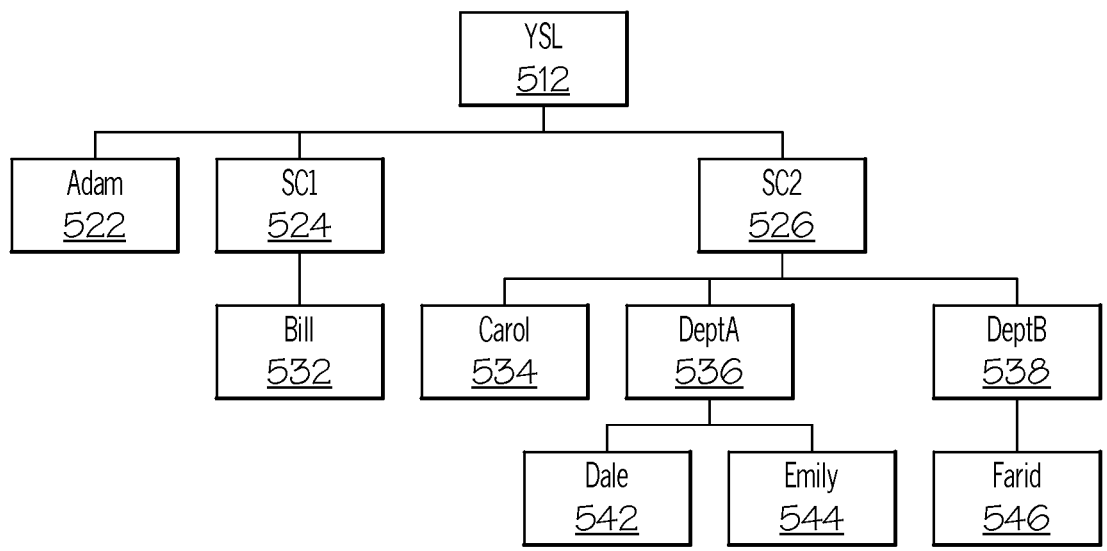
FIG. 5B is a graphical hierarchy of the objects.

FIG. 5A shows an example of repository entries 501, 502, 503, 504, 505 and 506 for a delegated administration hierarchy, which is the custom organizational hierarchy created with the Custom Access Controller. Each entry may or may not be a concrete entity representing an actual user or resource. For example, the entry may represent a business function or another arbitrary "entity." Each entry has links and pointers representing the entry's position in the hierarchy. A "viewEntryName" API returns the delegated administration path for an entity. For example, entry 504 could be expressed as:

viewEntryName/root/cn=Dale,L0=YSL,L1=SC2,
L2=DeptA where cn means "common name" and "L0," "L1," and "L2" refer to hierarchy levels. The delegated administration path describes the location of the entity in the organizational hierarchy and contains the security policy for the entity. FIG. 5B shows a graphical hierarchy constructed from the repository entries of FIG. 5A. the graphical hierarchy of FIG. 5B is exemplary of how View Processor Interface 400 displays the organizational data for entities in a hierarchy. Security attributes are applied to each entity in hierarchy. In FIG. 5B, Adam 522 is shown at the highest level of the hierarchy. Adam 522 is a manager, and has security rights to all objects in YSL 512 and every level below YSL 512. Bill 532 is only a member of SC1 524, and only has access to objects SC1 524. Carol 534 is a member of SC2 536, and has access to objects in SC2 536 and objects in lower levels DeptA 536 and DeptB 538. Dale 542 and Emily 544 each have access only to objects in DeptA 536. Farid 546 only has access to objects in DeptB 538.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process, responsive to an entity attempting to access a resource in a data repository, initiates a view processor component of IBM's WEBSPHERE Virtual Member Manager, wherein the view processor performs steps comprising:
    retrieving a delegated administration path describing a location of a resource in a custom organizational hierarchy;
    identifying a security policy for the resource;
    identifying a security policy for an entity attempting to access the resource;
    applying both the security policy for the entity attempting to access the resource to the delegated administration path and the security policy for the resource so that the delegated administration path describes a location of the entity attempting to access the resource in the custom organizational hierarchy and also contains the security policy for the entity attempting to access the resource; and sending the delegated administration path with both the applied security policies to an authorization engine, so that access to the resource can be granted or denied.

2. The computer implemented process of claim 1 further comprising a view processor interface component of IBM's WEBSPHERE Virtual Member Manager, wherein the view processor interface performs steps comprising:
    displaying the delegated administration path with the security policy of the resource graphically;
    responsive to a user input, changing the security policy for the resource; and
    responsive to a user input, creating a custom security policy for the resource.

3. The computer implemented process of claim 1 wherein the organizational hierarchy data and security policy are obtained from more than one data repository.

4. The computer implemented process of claim 1 wherein a first resource in a data repository can have a different delegated administration path than a second resource in the same data repository.

5. The computer implemented process of claim 1 wherein a resource can have more than one delegated administration path.

6. The computer implemented process of claim 5 wherein an application can specify which delegated administration path is sent to the authorization engine for making authorization decisions.

7. An apparatus for responding to an entity attempting to access a resource, the apparatus comprising:
    a processor;
    a memory connected to the processor;
    a view processor component running in the memory;
    a data repository in the memory;
    a resource in the data repository;
    a custom access controller program in the memory operable to:
        retrieve a delegated administration path describing the location of a resource in a custom organizational hierarchy;
        identify a security policy for the resource;
        identify a security policy for an entity attempting to access the resource;
        apply both the security policy for the entity attempting to access the resource to the delegated administration path and the security policy for the resource so that the delegated administration path describes a location of the entity attempting to access the resource in the custom organizational hierarchy and also contains the security policy for the entity attempting to access the resource; and
        send the delegated administration path with both the applied security policies to an authorization engine, so that access to the resource can be granted or denied.

8. The apparatus of claim 7 further comprising a view processor interface program component of IBM's WEBSPHERE Virtual Member Manager in the memory operable to:
    display the delegated administration path with the security policy of a resource graphically;
    responsive to a user input, change the security policy for resource; and
    responsive to a user input, create a custom security policy for the resource.

9. The apparatus of claim 7 wherein the organizational hierarchy data and security policy are obtained from more than one data repository.

10. The apparatus of claim 7 wherein a first resource in the data repository can have a different delegated administration path than a second resource in the data repository.

11. The apparatus of claim 7 wherein a resource can have more than one delegated administration path.

12. The apparatus of claim 11 wherein an application can specify which delegated administration path is sent to the authorization engine for making authorization decisions.

13. A computer readable memory containing a plurality of instructions to cause a computer to respond to an entity attempting to access a resource using a view processor component of IBM's WEBSPHERE Virtual Member Manager, the plurality of instructions comprising:
    a first instruction to retrieve a delegated administration path describing the location of a resource in the organizational hierarchy;
    a second instruction to identify a security policy for the resource;
    a third instruction to identify a security policy for an entity attempting to access the resource;
    a fourth instruction to apply both the security policy of the entity attempting to access the resource to the delegated administration path and the security policy of the resource so that the delegated administration path describes a location of the entity attempting to access the resource in the custom organizational hierarchy and also contains the security policy for the entity attempting to access the resource; and
    a fifth instruction to send the delegated administration path with the both applied security policies to an authorization engine, so that access to the resource can be granted or denied.

14. The computer readable memory of claim 13 with a plurality of instructions further comprising:
- a sixth instruction to display the delegated administration path with security policy for the resource graphically;
- a seventh instruction to, responsive to a user input, change the security policy for resource; and
- an eighth instruction to, responsive to a user input, create a custom security policy for the resource.

15. The computer readable memory of claim 13 wherein the organizational hierarchy data and security policy are obtained from more than one data repository.

16. The computer readable memory of claim 13 wherein a first resource in the data repository can have a different delegated administration path than a second resource in the data repository.

17. The computer readable memory of claim 13 wherein a resource can have more than one delegated administration path.

18. The computer readable memory of claim 17 wherein an application can specify which delegated administration path is sent to the authorization engine for making authorization decisions.

\* \* \* \* \*